United States Patent [19]
Durbin: Enoch J.

[11] Patent Number: 5,140,959
[45] Date of Patent: Aug. 25, 1992

[54] METHOD AND APPARATUS FOR OPERATION OF A DUAL FUEL COMPRESSION IGNITION COMBUSTION ENGINE

[76] Inventor: Durbin: Enoch J., 246 Western Way, Princeton, N.J. 08540

[21] Appl. No.: 646,395

[22] Filed: Jan. 28, 1991

[51] Int. Cl.⁵ ............................................. F02M 43/00
[52] U.S. Cl. ..................... 123/304; 123/299; 123/27G E; 123/527
[58] Field of Search ............... 123/300, 525, 526, 575, 123/585, 27GE, 344, 299, 527

[56] References Cited

U.S. PATENT DOCUMENTS

| | | | |
|---|---|---|---|
| 2,741,230 | 4/1956 | Reynolds | 123/304 |
| 4,449,509 | 5/1984 | Young | 123/527 |
| 4,535,728 | 8/1985 | Batchelor | 123/27GE |
| 4,619,240 | 10/1986 | Bedford et al. | 123/304 |
| 4,638,783 | 1/1987 | Snyder | 123/527 |
| 4,641,625 | 2/1987 | Smith | 123/575 |
| 4,700,672 | 10/1987 | Baguena | 123/299 |
| 4,864,990 | 9/1989 | Tateishi et al. | 123/304 |
| 4,864,991 | 9/1989 | Snyder et al. | 123/344 |

OTHER PUBLICATIONS

SAE The Engineering Society For Advancing Mobility Land Sea Air and Space; Technical Paper Series; Aug. 1989.
Mitsui Engineering & Shipbuilding Co., Ltd., Mitsui Gas Injection Diesel Engine; no date provided.
All Electronic Dual Fuel Injection . . . pp. 73–84.
AFS International Inc.; Reprinted From Automotive Engineering; Sep. 1989; vol. 97 No. 9.

Primary Examiner—Raymond A. Nelli
Attorney, Agent, or Firm—Venable, Baetjer and Howard

[57] ABSTRACT

A system for fueling a compression ignition engine that minimizes the quantity of ignition fuel required by controlling the quantity of combustible mixture, rather than the fuel to air ratio.

17 Claims, 6 Drawing Sheets

METHOD AND APPARATUS FOR OPERATION OF A DUAL FUEL COMPRESSION IGNITION COMBUSTION ENGINE

DESCRIPTION OF THE INVENTION

1. Field of Invention

This invention relates to apparatus for the control of a dual fuel compression ignition engine wherein a pilot quantity of compression ignitable fuel is used to ignite a combustible mixture of the main fuel and oxidizer, whereby the output torque or force of said engine is controlled by a throttle valve(s) that regulates the quantity of the main fuel and oxidizer maintaining a *constant proportionality*.

2. Background of the Invention

In prior art, dual fuel compression ignition engines in motor vehicles control of the output power of such engines is achieved by controlling the constant of proportionality of the main fuel with respect to the oxidizer of such engines, thus providing a variable fuel to air ratio for such engines. Low power is provided by lean mixtures, high power by richer mixtures. The main fuel in such engines is normally not compression ignitable. To ignite the main fuel a quantity of pilot fuel is injected into the combustion chamber after compression of the main fuel. The quantity of pilot fuel required for reliable consistent ignition has been shown to be strongly dependent on the fuel to air ratio of the main fuel, being a minimum for the richest mixtures of the main fuel and a maximum for the leanest mixtures. Some prior art engines inject a fixed quantity of pilot fuel into the combustion chamber prior to ignition and after compression. In such a system the injected pilot fuel needs to be sufficiently large to ignite the leanest mixture to be employed in operating the engine. It has been demonstrated that, for a majority of the operating time of engines in motor vehicles, low output torque is required, and hence very lean mixtures of the main fuel are employed for a majority of the operating time. One consequence of this method of operating prior art compression ignition engines in vehicles in a dual fuel mode is that, typically, half of the fuel consumed is compression ignitable and only half is the main fuel. The most important objective in operating engines in a dual fuel mode is to strongly reduce the use of compression ignitable fuels, which are often highly polluting, more expensive, and create quantities of carbon soot particulates in the exhaust stream of such engines.

To help reduce the quantity of compression ignitable fuel used, some recent systems have provided a variable quantity of compression ignitable fuels—a larger quantity being employed for leaner mixtures and a smaller quantity for richer mixtures. Again, since a majority of the engine operation is at low output torque, these later prior art systems make only small reductions in the use of compression ignitable fuels.

In prior art dual fuel compression ignition engines the main fuel is most often natural gas. Natural gas as a vehicle fuel provides a considerable reduction in noxious emissions as compared with other liquid fuels. The full potential of such dual fuel operation using natural gas is not fully realized by prior art engines.

The present invention and prior art in dual fuel engines both virtually eliminate smoke in the exhaust, and both increase peak output power by at least 10% over conventional compression ignition engines.

What is provided by the present invention as an improvement over the prior art is:

1. A reduction in the consumption of compression ignitable fuel to about one third or one fifth of that used in prior art.
2. A reduction in fuel consumed, both main fuel and pilot fuel, to about 70% of the prior art.
3. A reduction in carbon monoxide to about 80% of the prior art.
4. A reduction in unburned hydrocarbons in the exhaust to about 30% of the prior art.
5. A reduction in oxides of nitrogen in the exhaust to about 50% of the prior art.

It is important to note that both prior art dual fuel engines and the present invention reduce the noxious emissions tested above considerably over single fuel compression ignition engines.

3. Summary of the Invention

In the present dual fuel compression ignition engine control system, the first fuel, typically a gaseous fuel; is first mixed in a constant proportionality with the incoming oxidizer, preferably at about 50%–85% of the chemically correct ratio. The quantity of combustible mixture of this first fuel furnished the engine is controlled by use of a throttle valve(s) to provide the desired output engine torque or force. The combustible mixture is drawn into the engine by the pressure reduction developed downstream of the throttle valve(s) by motion of the piston in the combustion chamber. The combustible mixture is compressed after the intake valve of the combustion chamber is closed. When suitably compressed a small quantity of a second or pilot fuel is injected into the combustion chamber. This second fuel has a high cetane number and hence is ignitable by the elevated temperature of the compressed combustible mixture. The second fuel serves as the ignition source for the main fuel.

An important advantage of the present invention is that by providing a mixture of the main fuel which is approximately 50%–85% of the chemically correct ratio under all engine operating conditions, much smaller levels of the second pilot fuel is required. Typically, one third to one fifth of the second pilot fuel is required over prior art compression ignition dual fuel engines. One consequence is that a considerably smaller fraction of the total fuel consumed in normal operation of the engine in a motor vehicle is the compression ignitable fuel, typically one third to one fifth of that consumed by prior art engines.

4. Brief Description of the Drawings

FIG. 1 shows a preferred embodiment of the present invention where both first fuel (gas or liquid) and oxidizer (normally air) are first mixed in constant proportions by means of viscous flow elements where viscous forces are the dominant forces in the flow passing there through, and hence the pressure drop across such elements is proportional to the flow of fluid through such viscous flow elements. Constant proportions are achieved by a constant ratio of pass through areas of the viscous flow elements of the first fuel and the oxidizer. The quantity of combustible mixture provided to the engine is controlled by throttle valve control means to control the output torque of the engine. FIG. 1 includes sensor means in the exhaust stream of said engine to sense the proportionality of the products of combustion. A preferred sensor is an oxygen concentration sensor.

The sensor signal is used to maintain the constant of proportionality when the molecular composition of the first fuel changes, by adjustment of the pass through area of the first fuel viscous flow element. Fuel pressure is regulated by a pressure regulator valve.

FIG. 2 shows an embodiment employing a throttle valve for the oxidizer alone and a pressure regulator valve for the first fuel, which maintains the main fuel pressure at the oxidizer pressure downstream of the throttle valve. The constant of proportionality is maintained by the relative pass through areas of the viscous flow elements.

FIG. 3 shows another embodiment for controlling the flow of the first fuel and oxidizer, while maintaining a constant proportionately, by use of a shutter control means that adjusts the pass through areas of viscous flow elements simultaneously. One such viscous flow element is in the oxidizer flow path, another is in the first fuel path. The first fuel pressure is controlled to equal the oxidizer pressure.

Figure 6:
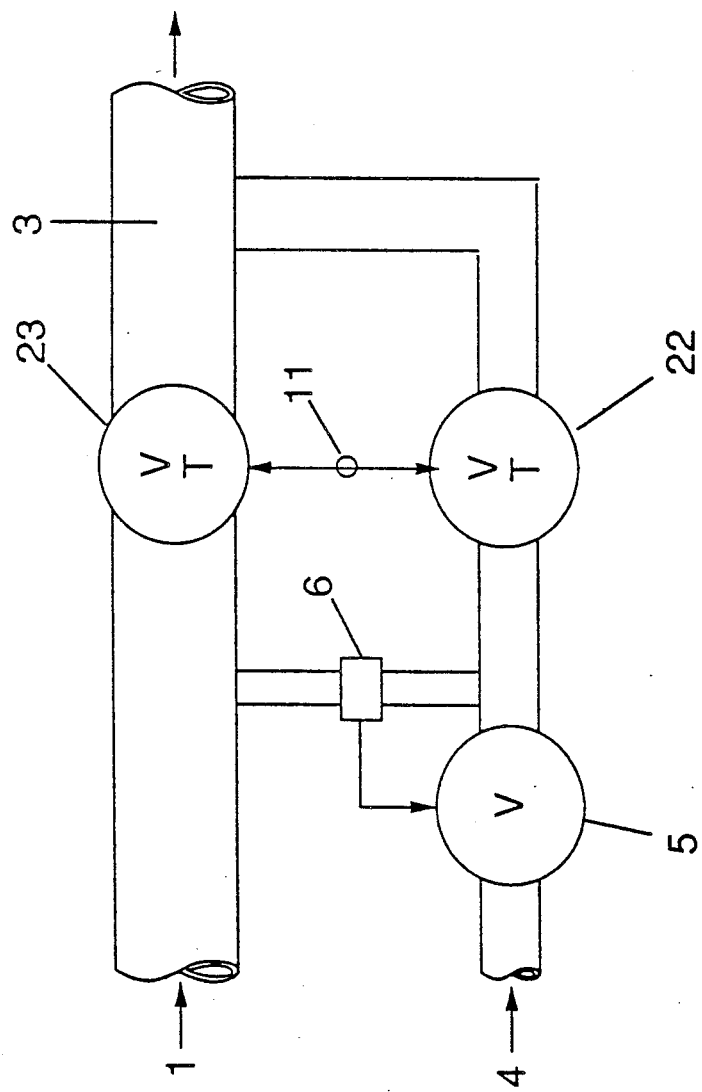

FIG. 6 shows still another method of maintaining a constant of proportionality between first fuel and oxidizer and controlling the output torque of the engine. Here a pressure equalizing valve for first fuel and oxidizer is used, as in the previous figures, and then separate throttle valves for first fuel and oxidizer are mechanically linked to maintain a constant of proportionality between first fuel and oxidizer. The quantity of combustible mixture furnished to the engine is controlled by the position of the mechanically linked throttle valves.

5. DETAILED DESCRIPTION OF THE DRAWINGS

Figure 1:
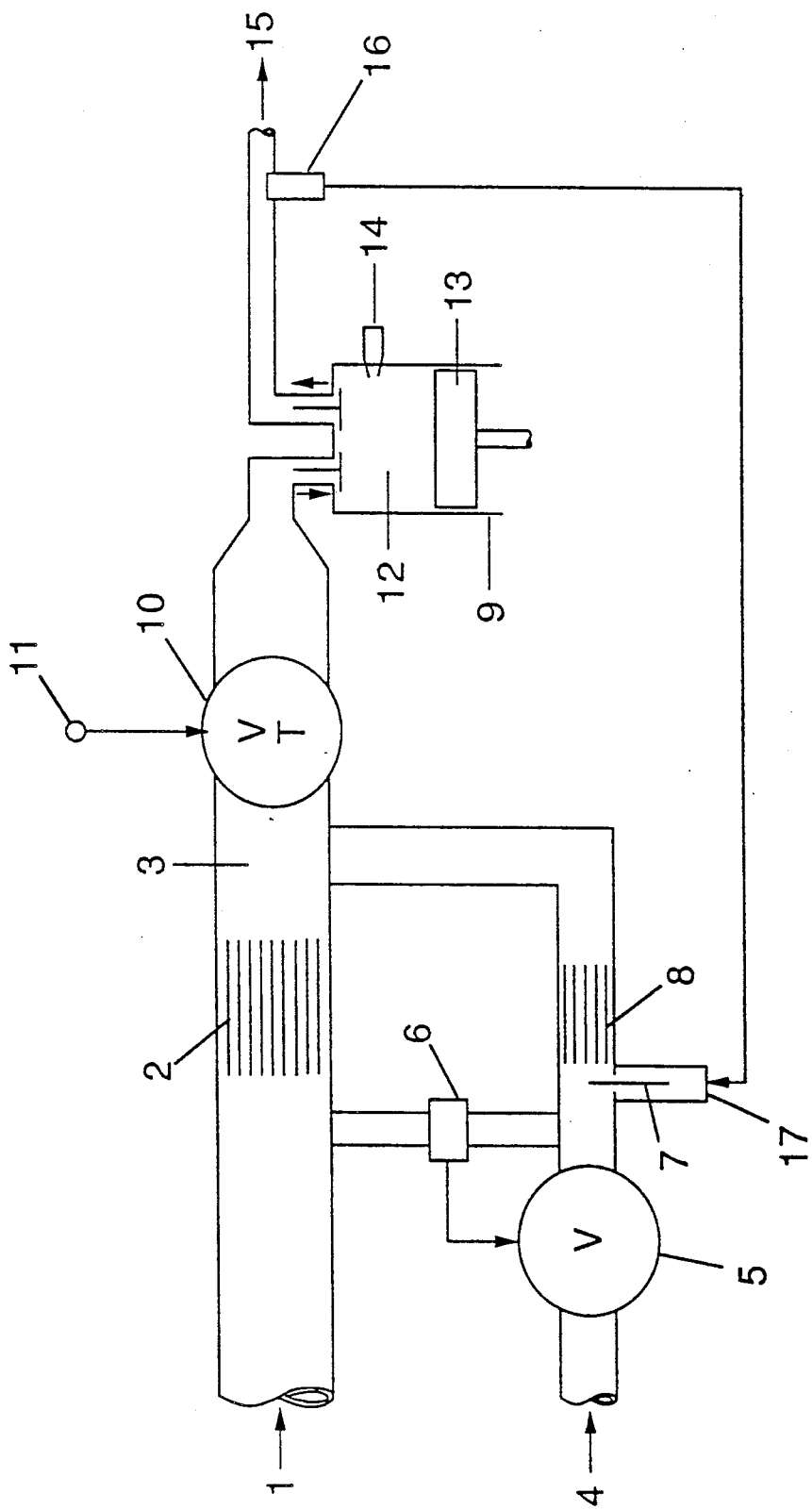

In FIG. 1 the oxidizer (1), usually air, is drawn past a viscous flow element (2) into a mixing chamber (3), the first fuel (4) is drawn past a fuel pressure regulator valve (5), the pressure sensor (6) compares the pressure of the oxidizer (1) upstream of the viscous flow element (2) with the first fuel pressure downstream of the fuel pressure regulator valve (5) and adjusts the fuel pressure regulator (5) to make the first fuel pressure equal to the oxidizer pressure. The first fuel (4) then flows past the shutter (7) which limits the pass through area of the first fuel viscous flow element (8). The first fuel then flows into the mixing chamber (3). The proportions of first fuel (4) and oxidizer (1) are thus constant and independent of flow rate. The quantity of combustible mixture flowing into the engine (9) is regulated by the throttle valve (10) in accordance with torque demand signal (11). The combustible mixture in the combustion chamber (12) of the engine (9) is compressed by a piston (13) after compression, an injector (14) injects a small quantity of compression ignitable second fuel into the combustion chamber (12), the second fuel ignites the first fuel combustible mixture. During the exhaust stroke of the engine (9) the proportion of products of combustion (15) in the exhaust stream are sensed by proportionality sensor means (16). The sensor signal is sent to the first fuel shutter control means (17) to control the shutter (7) which adjusts the pass through area of the first fuel viscous flow element (8), thereby regulating the proportions of first fuel (4) to oxidizer (1).

Figure 2:
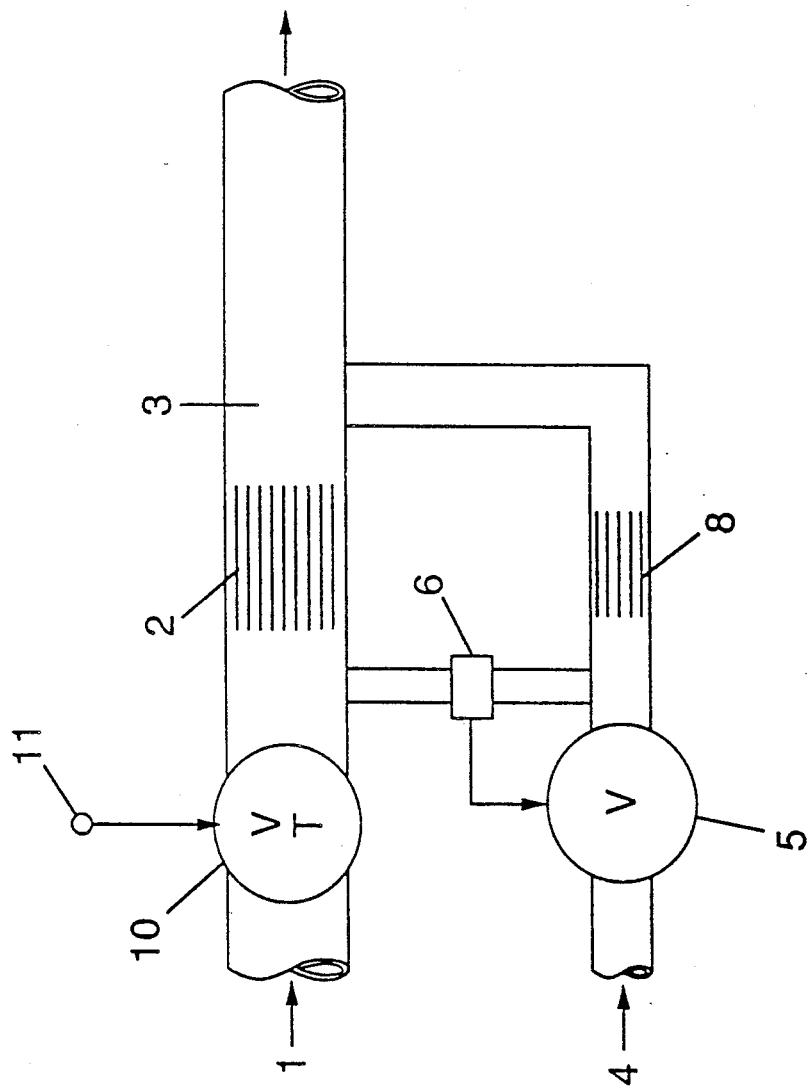

FIG. 2 shows the throttle valve (10) located upstream of the viscous flow element (2). The throttle valve (10) thereby regulates the quantity of oxidizer flowing into the viscous flow element (2) in accordance with the torque demand signal (11). The fuel pressure regulator valve (5) adjusts the first fuel pressure in accordance with the signal from the pressure sensor (6) which now compares the oxidizer pressure downstream of the throttle valve (10) with the first fuel pressure downstream of the fuel pressure regulator (5) and before the first fuel viscous flow element (8). The proportions of first fuel (4) and oxidizer (1) in the mixing chamber (3) are thus constant and independent of flow rate.

Figure 3:
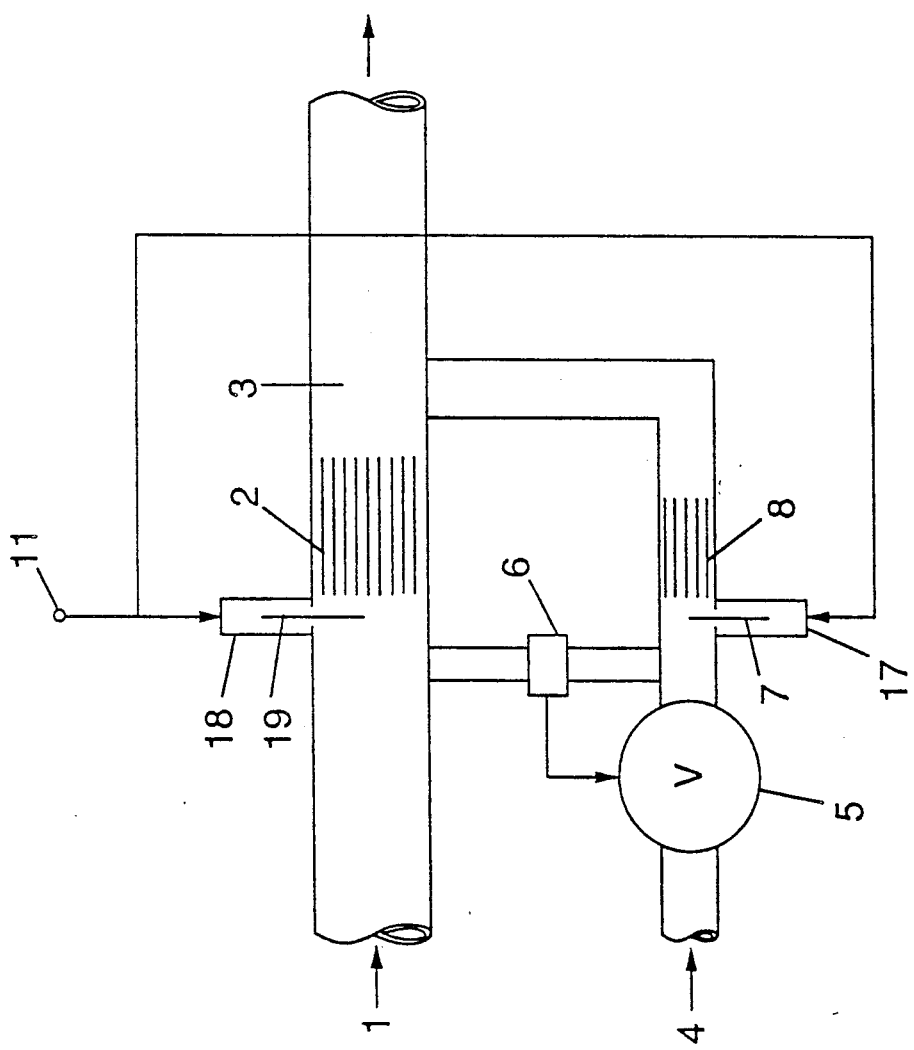

In FIG. 3, first fuel shutter control means (17) is mechanically coupled to oxidizer shutter control means (18) which adjust the first fuel shutter (7) and oxidizer shutter (19) respectively in accordance with the torque demand signal (11). The pass through areas of the first fuel viscous flow element (8) and the oxidizer viscous flow element (2) are controlled in fixed proportions, hence the proportions of first fuel (4) and oxidizer (1) in the mixing chamber (3) are thus constant and independent of flow rate.

Figure 4:
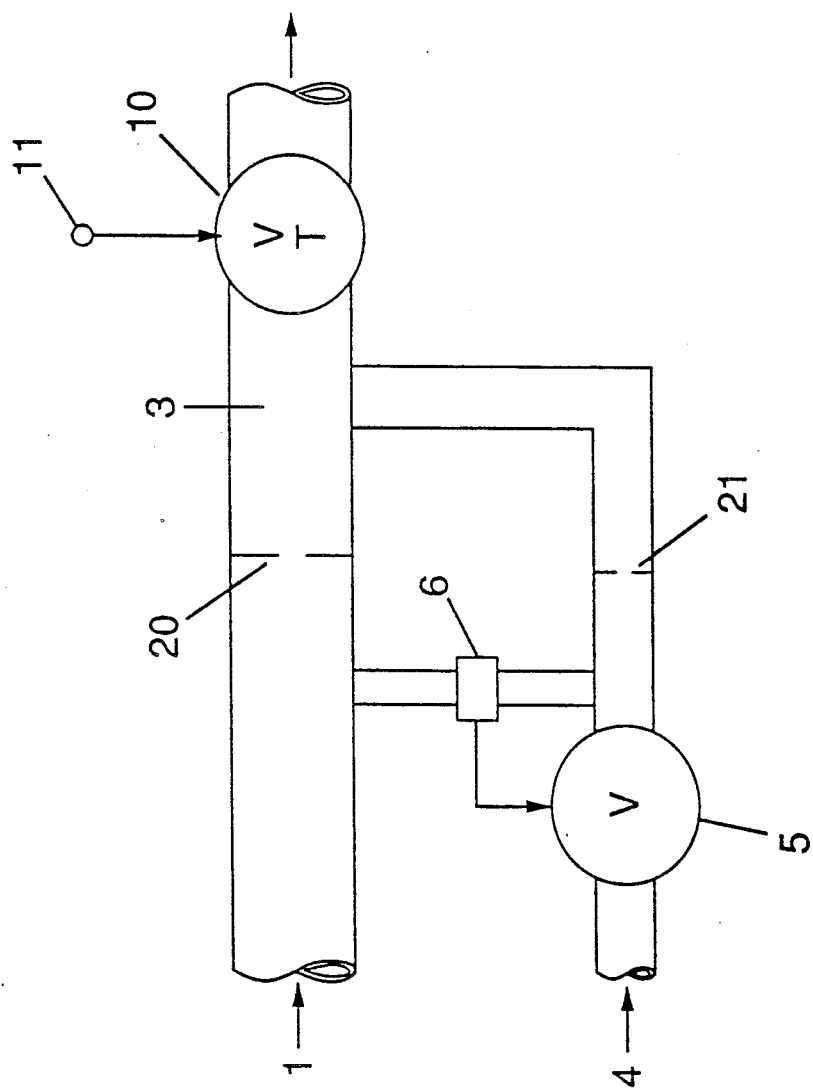
FIG. 4 shows another embodiment in which a single throttle valve means is used to control the quantity of combustible mixture provided to the engine as in FIG. 1 but where the ratio of the open areas of the orifice elements are used to maintain a constant proportionality between the first fuel and oxidizer. Again, the first fuel pressure is equalized with that of the oxidizer.

In FIG. 4, the oxidizer orifice (20) limits the pass through area of the oxidizer (1), while the first fuel orifice (21) limits the pass through area of the first fuel (4), hence the proportions of first fuel (4) to oxidizer (1) in the mixing chamber (3) are constant and independent of flow rate and proportional to the ratio of pass through areas of the orifices (20, 21). The quantity of combustible mixture flowing into the engine is controlled by the throttle valve (10) in accordance with the torque demand signal (11).

Figure 5:
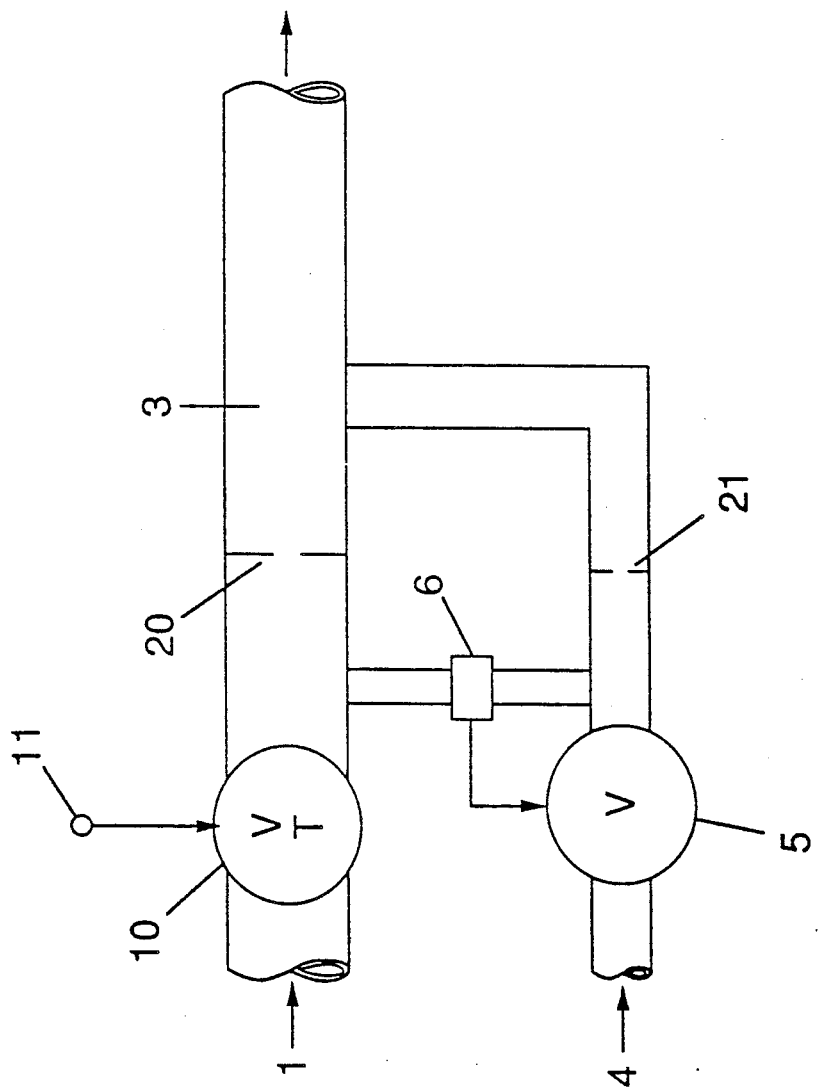
FIG. 5 shows another embodiment of the present invention in which a throttle valve for the oxidizer alone and a pressure regulator for the first fuel are employed as in FIG. 2, but where the ratio of the open areas of the orifice elements are used to maintain a constant proportionality between the first fuel and oxidizer.

FIG. 5 shows a system for control of the quantity of first fuel (4) and oxidizer (1) which is the same as that shown in FIG. 2. The proportionality of first fuel (4) and oxidizer (1) in the mixing chamber (3) are constant and are determined by the pass through areas of the orifices (20, 21).

FIG. 6 shows yet another embodiment of the invention. Throttle valves (23, 22) are mechanically linked and are simultaneously controlled in accordance with the torque demand signal (11). The throttle valve (23) controls the quantity of oxidizer (1) flowing into the mixing chamber (3). The pressure sensor (6) compares the pressure of the oxidizer (1) upstream of throttle valve (23) with the first fuel pressure downstream of the fuel pressure regulator (5) and adjusts the fuel pressure regulator (5) to make the first fuel pressure equal to the oxidizer pressure. The quantity of first fuel (4) permitted to flow into mixing chamber (3) is controlled by throttle valve (22).

I claim:

1. A dual fuel engine control system for controlling the power output of a dual fuel compression ignition engine, comprising:

mixing means for combining an oxidizer and a primary fuel at a substantially constant ratio of oxidizer to primary fuel thereby forming a combustible mixture having said substantially constant ratio of oxidizer to primary fuel;

a combustible mixture supply line for delivering the combustible mixture to a combustion chamber of a compression ignition engine;

means for controlling the power output of the compression ignition engine by controlling the quantity of the combustible mixture delivered to the combustion chamber of the compression ignition engine; and a fuel injection apparatus which injects a compression ignitable fuel into the combustion chamber of the compression ignition engine in order to ignite the combustible mixture delivered to the combustion chamber.

2. The control system of claim 1, wherein said mixing means is operable to combine the oxidizer and primary fuel so that said substantially constant ratio of oxidizer to primary fuel of the combustible mixture is in the range of about 50% to 85% of a chemically correct ratio for the combustible mixture.

3. The control system of claim 1, wherein said mixing means comprises:
   a mixing chamber;
   an oxidizer supply line for delivering oxidizer to said mixing chamber; and
   a primary fuel supply line for delivering primary fuel to said mixing chamber.

4. The control system of claim 3, wherein said mixing means further comprises a fuel flow controller coupled to said primary fuel supply line for regulating the flow of the primary fuel so that the oxidizer and primary fuel are delivered to said mixing chamber at said substantially constant ratio.

5. The control system of claim 4, wherein said mixing means further comprises a sensor coupled to said oxidizer supply line and said primary fuel supply line and adapted to determine the ratio of the oxidizer in said oxidizer supply line to the primary fuel in said primary fuel supply line, said fuel flow controller being responsive to said sensor.

6. The control system of claim 4, wherein said mixing means further comprises a pressure sensor coupled to said oxidizer supply line and said primary fuel supply line for comparing the pressure of the oxidizer and the primary fuel, wherein said fuel flow controller is a pressure regulator valve responsive to said pressure sensor.

7. The control system of claim 3, wherein said mixing means further comprises:
   an oxidizer flow restrictor coupled to said oxidizer supply line for limiting the flow of oxidizer in said oxidizer supply line; and
   a primary fuel flow restrictor coupled to said primary fuel supply line for limiting the flow of primary fuel in said primary fuel supply line.

8. The control system of claim 7, wherein said mixing means further comprises:
   a fuel flow controller coupled to said primary fuel supply line for regulating the flow of the primary fuel so that the oxidizer and primary fuel are delivered to said mixing chamber at said substantially constant ratio; and
   a sensor coupled to said oxidizer supply line and said primary fuel supply line and adapted to determine the ratio of the oxidizer in said supply line to the primary fuel in said primary fuel supply line, said fuel flow controller being responsive to said sensor; wherein said means for controlling the power output comprises an adjustable flow valve responsive to a power demand signal and which regulates the quantity of the combustible mixture delivered to the combustion chamber of the engine.

9. The control system of claim 8, wherein said flow valve is coupled to said oxidizer supply line and regulates the quantity of oxidizer delivered to said mixing chamber and subsequently to the combustion chamber of the engine.

10. The control system of claim 9, wherein said flow valve is positioned upstream of said oxidizer flow restrictor, and said sensor senses the pressure of the oxidizer downstream of said flow valve and upstream of said oxidizer flow restrictor; and
    wherein said fuel flow controller is positioned upstream of said primary fuel flow restrictor, and said sensor senses the pressure of the primary fuel downstream of said fuel flow controller and upstream of said primary fuel flow restrictor.

11. The control system of claim 9, wherein said flow valve is positioned upstream of said oxidizer flow restrictor, and said sensor senses the pressure of the oxidizer upstream of said flow valve;
    wherein said fuel flow controller is positioned upstream of said primary fuel flow restrictor;
    wherein said means for controlling the power output further comprises an adjustable primary fuel flow valve coupled to said primary fuel supply line upstream of said primary fuel flow restrictor and said fuel flow controller, said primary fuel flow valve being responsive to the power demand signal in order to regulate the quantity of primary fuel delivered to said mixing chamber and subsequently to the combustion chamber; and
    wherein said sensor senses the pressure of the primary fuel downstream of said fuel flow controller and upstream of said primary fuel flow valve.

12. The control system of claim 8, wherein said flow valve is coupled to said combustible mixture supply line.

13. The control system of claim 1, further comprising:
    sensor means for sensing the proportion of combustion products exiting the engine; and
    a primary fuel flow regulator means responsive to said sensor means for controlling the quantity of primary fuel delivered to the combustion chamber of the engine.

14. A method for controlling the power output of a dual fuel compression ignition combustion engine, comprising the following steps:
    combining an oxidizer and a primary fuel in a mixing chamber at a substantially constant ratio of oxidizer to primary fuel to form a combustible mixture having said substantially constant ratio of oxidizer to primary fuel;
    delivering the combustible mixture from the mixing chamber to a combustion chamber of a dual fuel compression ignition combustion engine;
    introducing a compression ignitable fuel to the combustion chamber of the engine in order to ignite the combustible mixture; and
    adjusting the power output of the engine by varying the quantity of the combustible mixture delivered to the combustion chamber of the engine.

15. The method of claim 14, wherein said step of combining an oxidizer and a primary fuel comprises the steps of:
    delivering an oxidizer and a primary fuel to a mixing chamber for mixing;

comparing the pressure of the oxidizer and the primary fuel before delivery of the oxidizer and primary fuel to the mixing chamber and providing a feedback signal to a primary fuel pressure regulator; and adjusting the primary fuel pressure regulator based on said feedback signal in order to adjust the pressure of the primary fuel delivered to said mixing chamber so that said substantially constant ratio of oxidizer and primary fuel is delivered to said mixing chamber.

16. The method of claim 15, wherein said step of adjusting the power output of the engine comprises the step of adjusting the quantity of oxidizer and primary fuel delivered to said mixing chamber.

17. The method of claim 15, wherein said step of adjusting the power output comprises the step of adjusting the quantity of combustible mixture delivered from the mixing chamber to the combustion chamber of the engine.

* * * * *